United States Patent Office 3,419,381
Patented Dec. 31, 1968

---

3,419,381
CONTROLLING WEEDS IN SUGAR BEETS AND GRAMINACEOUS CROPS WITH PYRIDAZINE DERIVATIONS
Jacques Desmoras, Orly, and Pierre Jacquet, Thiais, France, assignors to Rhone-Poulenc S.A., Paris, France, a French body corporate
No Drawing. Filed Apr. 16, 1965, Ser. No. 448,866
Claims priority, application France, Apr. 20, 1964, 971,551, Patent 1,411,030
13 Claims. (Cl. 71—92)

ABSTRACT OF THE DISCLOSURE

Pyridazine derivatives of the formula:

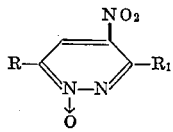

where R is lower alkyl and $R_1$ is lower alkoxy, are valuable herbicides useful, inter alia, for killing weeds in crops of beets and grains.

---

This invention is for improvements in or relating to herbicidal compositions.

It has unexpectedly been discovered that pyridazine derivatives of the general formula:

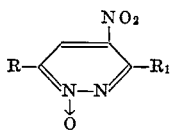

wherein R represents an alkyl group containing 1 to 4 carbon atoms and $R_1$ represents an alkoxy group containing 1 to 4 carbon atoms, are valuable herbicides.

The present invention, therefore, provides herbicidal compositions containing, as active ingredient, at least one pyridazine derivative of Formula I in association with at least one compatible diluent suitable for use in herbicidal compositions. The compatible diluent can be a mineral, animal or vegetable oil, or a liquid other than a mineral, animal or vegetable oil containing a wetting, dispersing or emulsifying agent, or a solid. Preferably the compositions contain between 0.005 and 50% by weight of pyridazine compound.

The pyridazine may be dissolved or dispersed in a liquid diluent. The compositions may thus take the form of suspensions, emulsions or solutions in organic or aqueous-organic media, for example aromatic hydrocarbons such as toluene or xylene, acetophenone, or mineral, animal or vegetable oils, or mixtures of these diluents. The compositions in the form of suspensions, emulsions or solutions may contain wetting dispersing or emulsifying agents of the ionic or non-ionic type, for example sulphoricinoleates, quaternary ammonium derivatives, or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When desired, the emulsions of the pyridazines may be in the form of self-emulsifying concentrates containing the active substance dissolved in the emulsifying agent or in a solvent containing an emulsifying agent compatible with the solvent, a simple addition of water to such concentrates producing compositions ready for use.

Examples of suitable solid diluents for association with the pyridazine are talc, calcined magnesia, kieselguhr, tricalcium phosphate, powdered cork, absorbent carbon black, a clay such as kaolin or bentonite or a compatible solid wetting or dispersing agent. The solid compositions, which may take the form of dusts, granules or wettable powders, are preferably prepared by grinding the pyridazine compound with the solid diluent or by impregnating the solid diluent with a solution of the pyridazine in a volatile solvent, evaporating the solvent and, if necessary, grinding the product so as to obtain a powder. Granular formulations may be prepared by absorbing the pyridazine dissolved in a volatile solvent onto the solid diluent in granular form and evaporating the solvent, or by granulating compositions in powder form obtained as described above. A wetting, dispersing or emulsifying agent, which can be present in solid compositions of the invention, particularly in wettable powders, may be of the ionic or nonionic type, for example any of those described above. Wettable powders according to the present invention may be treated with water immediately before use to give compositions ready for application.

Herbicidal compositions in the form of aerosols containing one or more of the pyridazine derivatives of Formula I are also within the scope of the present invention.

Any of the foregoing compositions may additionally contain adhesives or other conventional additives.

The invention includes also the use of herbicidal compositions containing at least one pyridazine derivative of Formula I, together with one or more compatible diluents, to control the growth of weeds. The compositions are preferably employed as selective postemergence herbicides by applying them, e.g., by spraying, to the plants to be destroyed. They may also be used as total weed-killers, in particular on annual weeds, as desiccants for plants such as the potato, and as defoliants.

They are particularly active on weeds such as charlock (*Sinapis arvensis*), wild radish (*Raphanus raphanistrum*), mayweed (*Matricaria inodora*), cornflower (*Centaurea cyanus*) and knotgrass (*Polygonum lapathifolium*). They are preferably employed for weeding beet crops and graminaceous crops.

The doses employed vary in accordance with the nature of the plants to be destroyed and upon the desired effect. Taking into account these two factors, doses of pyridazine compound of 1 to 10 kg. per hectare give good results.

The pyridazine derivatives of Formula I can be prepared by nitration with nitric acid in the presence of sulphuric acid of a pyridazine of the formula:

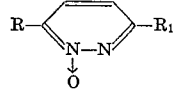

wherein R and $R_1$ are as hereinbefore defined. Pyridazine derivatives which may be prepared in this manner are 3-methoxy-4-nitro-6-methylpyridazine-1-oxide (M.P. 100–101° C.), 3-ethoxy-4-nitro-6-methylpyridazine-1-oxide (M.P. 100° C.), 3-propoxy-4-nitro-6-methylpyridazine-1-oxide (M.P. 30° C.) and 3-butoxy-4-nitro-6-methylpyridazine-1-oxide (M.P. 32° C.).

The following examples illustrate herbicidal compositions according to the invention.

EXAMPLE I

A solution of 5 g. of 3-methoxy-4-nitro-6-methylpyridazine-1-oxide and 1 g. of the condensation product of octaphenol and ethylene oxide (in a proportion of 10 moles of ethylene oxide to one mole of octylphenol) in 20 cc. of acetophenone is prepared, and 1 litre of water is added to this solution. The emulsion thus obtained is employed for weeding beet crops at a rate of application of 1,000 litres per hectare.

EXAMPLE II

To a solution of 1 g. of 3-methoxy-4-nitro-6-methylpyridazine-1-oxide in 5 cc. of acetophenone is added 0.2 g. of the condensation product of octylphenol and ethylene oxide (in a proportion of 10 moles of ethylene oxide per mole of octylphenol). The solution obtained is suspended in 100 cc. of water and the emulsion thus produced is immediately used for the destruction of weeds.

EXAMPLE III

A mixture of 1 g. of 3-methoxy-4-nitro-6-methylpyridazine-1-oxide and 150 mg. of Tween 80 (monooleate of a polyoxyethylene derivative of sorbitol) is ground in a micronising mill, 20 cc. of water being gradually added during the course of the grinding. The micronised suspension thus obtained is diluted in the necessary quantity in order to obtain the desired concentration of active product and thereafter immediately employed for the destruction of weeds.

EXAMPLE IV

To a solution of 10 g. of 3-ethoxy-4-nitro-6-methylpyridazine-1-oxide in 50 cc. of acetophenone are added 2 g. of the condensation product of octylphenol and ethylene oxide (in a proportion of 10 moles of ethylene oxide per mole of octylphenol). The solution thus obtained is suspended in 1 litre of water and the emulsion thus produced is employed to destroy weeds.

We claim:

1. A method of killing undesired vegetation which comprises applying to the vegetation a herbicidally effective quantity of herbicidal composition comprising a pyridazine derivative of the formula:

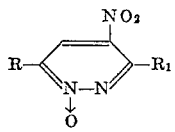

wherein R represents an alkyl group containing 1 through 4 carbon atoms and $R_1$ represents an alkoxy group containing 1 through 4 carbon atoms, homogeneously dispersed in a compatible inert diluent suitable for use in herbicidal compositions.

2. A method according to claim 1 wherein the herbicidal composition also contains a wetting, dispersing or emulsifying agent.

3. A method of controlling the growth of weeds which comprises applying to the weeds a herbicidally effective quantity of a herbicidal composition comprising a pyridazine derivative of the formula:

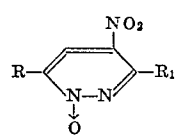

wherein R represents an alkyl group containing 1 through 4 carbon atoms and $R_1$ represents an alkoxy group containing 1 through 4 carbon atoms, homogeneously dispersed in a compatible inert diluent suitable for use in herbicidal compositions.

4. A method according to claim 3 wherein the weed is charlock.

5. A method of controlling the growth of weeds which comprises applying to the weeds a herbicidally effective quantity of a herbicidal composition containing 3-methoxy - 4-nitro-6-methylpyridazine-1-oxide, 3-ethoxy-4-nitro-6-methylpyridazine-1-oxide, 3-propoxy-4-nitro-6-methylpyridazine-1-oxide or 3-butoxy-4-nitro-6-methylpyridazine-1-oxide, homogeneously dispersed in a compatible inert diluent suitable for use in herbicidal compositions.

6. A method of controlling the growth of weeds in beet by post-emergence application to the crop area of a herbicidal composition comprising a pyridazine derivative of the formula:

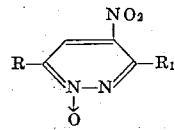

wherein R represents an alkyl group containing 1 through 4 carbon atoms and $R_1$ represents an alkoxy group containing 1 through 4 carbon atoms, homogeneously dispersed in a compatible inert diluent suitable for use in herbicidal compositions, at a rate of application sufficient to control the weeds without substantial damage to the beet.

7. A method according to claim 6 in which the rate of application of the herbicidal composition is such as to give a dosage of pyridazine derivative of 1 to 10 kg. per hectare of crop area.

8. A method of controlling the growth of weeds in graminaceous crops by postemergence application to the crop area of a herbicidal composition comprising a pyridazine derivative of the formula:

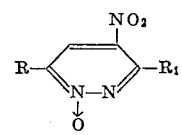

wherein R represents an alkyl group containing 1 through 4 carbon atoms and $R_1$ represents an alkoxy group containing 1 through 4 carbon atoms, homogeneously dispersed in a compatible inert diluent suitable for use in herbicidal compositions, at a rate of application sufficient to control the weeds without substantial damage to the graminaceous crop.

9. A method according to claim 8 in which the rate of application of the herbicidal composition is such as to give a dosage of pyridazine derivative of 1 to 10 kg. per hectare of crop area.

10. A method according to claim 3 wherein the weed is wild radish.

11. A method according to claim 3 wherein the weed is mayweed.

12. A method according to claim 3 wherein the weed is cornflower.

13. A method according to claim 3 wherein the weed is knotgrass.

References Cited

UNITED STATES PATENTS 3,056,781  10/1962  Papesch _____ 71—92
3,244,714  4/1966   Geary _____ 71—92

FOREIGN PATENTS 2,310  2/1964  France.

OTHER REFERENCES

Miyazawa et al.: C.A. 58 (1963), p. 769.
Kano et al.: C.A. 62 (1965), p 2782, September 1964.
Hayashi et al.: C.A. 62 (1965), p. 2782, June 1964.

LEWIS GOTTS, Primary Examiner.

G. HOLLRAH, Assistant Examiner.

U.S. Cl. X.R.

71—74; 260—250